March 20, 1962 E. J. MORAN 3,025,612
MULTIPLICATION DEVICE
Filed June 5, 1961 2 Sheets-Sheet 1
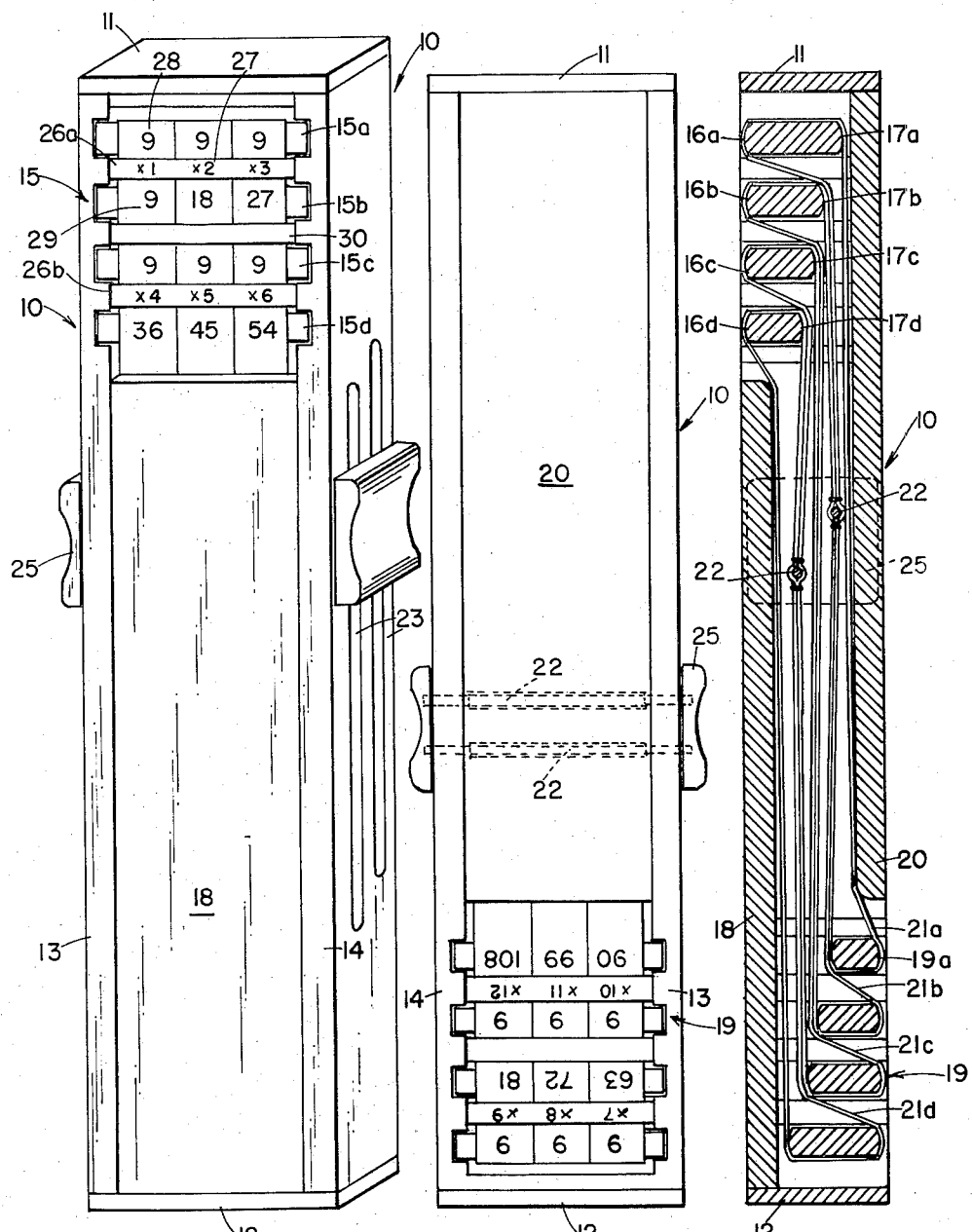
INVENTOR.
Edward J. Moran
BY
ATTORNEY.

March 20, 1962

E. J. MORAN 3,025,612

MULTIPLICATION DEVICE

Filed June 5, 1961

INVENTOR.
Edward J. Moran
BY
ATTORNEY.

United States Patent Office 3,025,612
Patented Mar. 20, 1962

3,025,612
MULTIPLICATION DEVICE
Edward J. Moran, 49 E. 32nd St., Brooklyn 26, N.Y.
Filed June 5, 1961, Ser. No. 115,022
3 Claims. (Cl. 35—31)

This invention relates to educational devices or toys and more particularly to devices for aiding the study of mathematics, though the invention is not so limited, as will be explained later below.

The primary object of the invention is to teach the multiplication table to a child, but the same general physical embodiment of the invention may be employed to make interesting to a child the learning of various associations of facts, especially where three items or factors are involved and two are related to each other through a third.

The illustrated embodiments comprise a plurality of endless belts all movable simultaneously at the same rate, and bearing a series of indicia or legends so that for an increment of movement predetermined numbers or legends become visible to the user and those on one belt bear some relationship to those visible on another belt. Fixed panels near the viewing zone indicate what the relationship is. The belts are mounted in an oblong box-like housing of generally the same size and shape as a pencil box.

In the accompanying drawing showing, by way of example, two of many possible embodiments of the invention, FIGURE 1 is a perspective view of one form of the invention predominantly viewed from the front.

FIGURE 2 is a rear elevation of the invention shown in FIGURE 1.

FIGURE 3 is a longitudinal sectional view of the invention shown in FIGURES 1 and 2.

Figure 4:
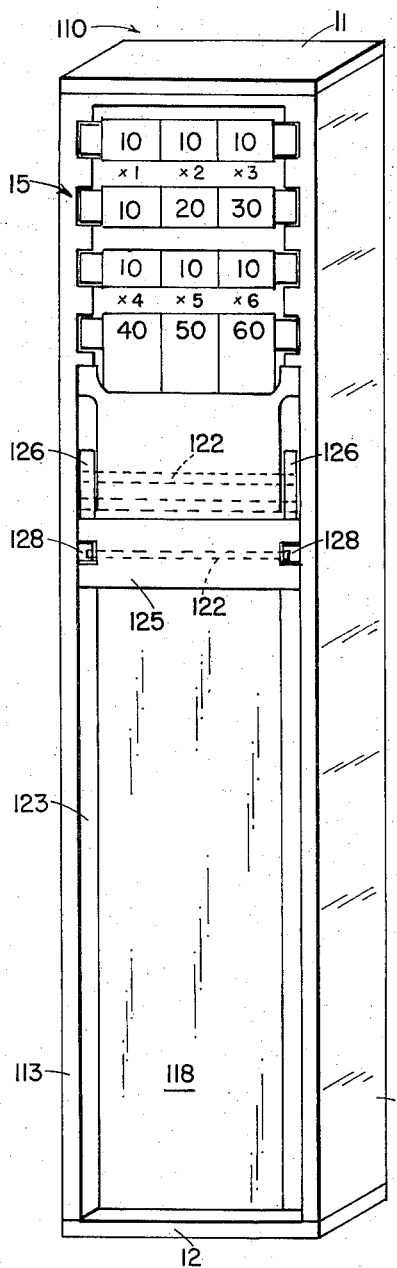
FIGURE 4 is a perspective of another form of the invention.

In the first form of the invention as shown in FIGURE 1, a parallelepiped oblong housing 10 comprises like end members 11 and 12 secured on substantially like or symmetrical side members 13 and 14. In the housing near the end member 11 there are mounted on the side members a set 15 of four spaced transverse slats 15a, 15b, 15c and 15d parallel with the end member and of progressively narrower width according to their distance from the end member. The outer edges of the respective slats are rounded as at 16a, 16b, 16c and 16d and lie somewhat in the front plane of the housing, while the inner edges 17a, 17b, 17c and 17d overhang the narrower adjacent slats. The housing is provided with a front cover 18 extending from the end member 12 nearly to the narrowest slat 15.

Near the opposite end member 12 is a similar set 19 of four slats, only lying with their edges in the rear plane of the housing. With a back 20 like front cover 18 and similarly located, and four endless belts 21a, 21b, 21c and 21d passing respectively over the widest slat 15a of one set and the narrowest slat 19a of the other set, and so on for the remainder. The physical construction and contents of the housing so far described are the same for one end at the front and the other end at the rear. This enables all belts to be of the same length.

As will be observed from the drawing, the stepping of the back edges of slats throws the laps of the belts into three pairs in face-to-face contact and each slat has only one lap to pass over the front edges such as 16a, 16b etc. The belts 21a, 21b at their planes of contact as well as belts 21c, 21d are secured to transverse rods 22 slidably disposed in and through longitudinal slots 23 in the side members for moving the belts. Ends 24 of the rods projecting to the exterior are fitted with handles or finger pieces, giving the rods and handles a substantially rigid structure to move the taut belts back and forth.

Spaces between the outer edges of the slats 15a, 15b and 15c, 15d are provided with transverse panels such as 26a, 26b, visible and bearing indicia 27 which in the present example are multipliers for multiplicand indicia 28 on the belt, say, 21a above. Product indicia 29 are on belt 21b below.

Since all belts move with the same linear displacement, belt 21a carrying multiplicands will move the same amount (though in opposite sense) as belt 21b carrying products, so that by having the indicia on all belts spaced equally along the belts movement of the belts will enable simultaneous display of multiplicands and products. The same is true for the other two belts and at the reverse end portion at the slats 19.

The use of such indicia makes possible in the embodiment shown in the drawing a plurality of multiplication tables, the belts being shown in position for the "nine" table and with the multipliers being in three columns per panel. All products from unity to 144 are viewable by moving the handles 25 to the required position.

The physical embodiment may be used for the teaching of foreign words by providing a panel 30 between slats 15b and 15c and similar to those at 26a and 26b. In such usage the English word could appear on belt 21a and its translation on the belts below it. The name of the language would appear on the fixed panel above the translation.

Figure 5:
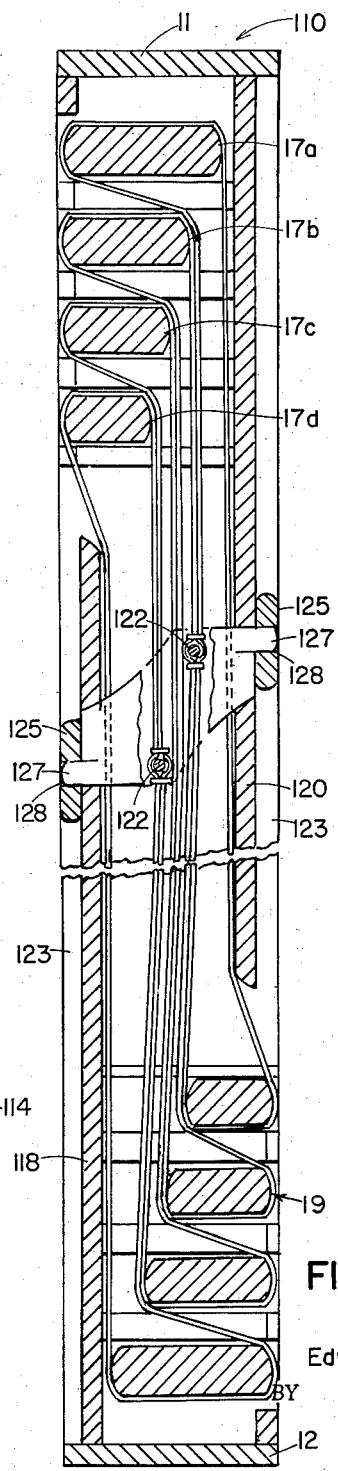
FIGURE 5 is a longitudinal sectional view of the invention shown in FIGURE 4.

In another form of the invention as shown in FIGURES 4 and 5 the device 110 is similar to that shown in FIGURE 1 with respect to the end members 11 and 12, slats 15 and 19 and the associated belts and panels.

The side members 113 and 114 are similar to members 13 and 14 except for the omission of slots 23. The front and rear covers 118 and 120 are secured to the side members spaced inwardly from the exterior planes to receive finger pieces 125 flush with the side members and slidable on the covers.

A pair of rods 122 are similar to the pair 22 except they do not pass into the side members. On the respective ends of the rods 122 are mounted thin slide blocks 126 engaged against the side members and having front and rear projections 127 passing through longitudinal slots 123 on each side of the covers 118 and 120 and secured in end slots 128 in the finger pieces 127.

In operation of either form of the invention the handles or finger pieces are moved longitudinally on the housing to register the desired multiplicands (which will here all be the same for a given position of the handles) and the corresponding products can be read from the associated belts. In the forms shown the largest multiplier is 12 while the number of multiplicands and products is limited only by the length of movement of the belts relative to the thickness of the slats for displaying a single line.

The present examples are only to illustrate the concept of the invention as defined in the following claims.

The invention claimed is:

1. An educational device comprising an oblong parallelepiped housing having side and end members; a set of spaced transverse slats mounted on the side members in the housing parallel with the end members and adjacent one of the members and having progressively decreasing width away from that end member, the slats having outer edges approximately lying in the front plane of the housing, a like set of slats mounted in the housing with their outer edges approximately in the rear plane of the housing so that the sets are symmetrical about the front-to-rear diagonal plane of the housing; endless taut belts, each respectively about a larger slat in the one set and the corresponding smaller slat in the other set, said belts being provided with indicia at uniform intervals along portions thereof, panels between at least some of the slats and carrying indicia thereon, and means to move manually all the belts in unison.

2. An educational device comprising an oblong parallelepiped housing having side and end members; a set of spaced transverse slats mounted on the side members in the housing parallel with the end members and adjacent one of the members and having progressively decreasing width away from that end member, the slats having outer edges approximately lying in the front plane of the housing, a like set of slats mounted in the housing with their outer edges approximately in the rear plane of the housing so that the sets are symmetrical about the front-to-rear diagonal plane of the housing; endless taut belts, each respectively about a larger slat in one set and the corresponding smaller slat in the other set, said belts being provided with indicia at uniform intervals along portions thereof, panels between at least some of the slats and carrying indicia thereon, at least one transverse rod fast on two adjacent belts and having the ends of the rods projecting laterally from the belts, and finger pieces slidable on the housing and secured fast with respect to the rod ends for shifting the belts.

3. A device as claimed in claim 2 the indicia on a panel between adjacent slats being the quotients of belt-carried indicia at the outer edge of one such slat divided by the indicia of the belt-carried indicia at the outer edge of the other adjacent slat.

References Cited in the file of this patent

UNITED STATES PATENTS 718,520    Prosser ---------------- Jan. 13, 1903